(12) United States Patent
Thuresson et al.

(10) Patent No.: US 10,946,452 B2
(45) Date of Patent: Mar. 16, 2021

(54) CUTTING TOOL AND A NOZZLE WITH INTERNALLY EXTENDING GROOVES

(71) Applicant: SECO TOOLS AB, Fagersta (SE)

(72) Inventors: Jonas Thuresson, Fagersta (SE); Andreas J Larsson, Arboga (SE); Jimmy Thelin, Fagersta (SE); Mats Jonsson, Hedemora (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 15/738,744

(22) PCT Filed: Jun. 2, 2016

(86) PCT No.: PCT/SE2016/050523
§ 371 (c)(1),
(2) Date: Dec. 21, 2017

(87) PCT Pub. No.: WO2017/003343
PCT Pub. Date: Jan. 5, 2017

(65) Prior Publication Data
US 2018/0185927 A1    Jul. 5, 2018

(30) Foreign Application Priority Data

Jun. 30, 2015 (EP) ..................................... 15174654
Jun. 30, 2015 (EP) ..................................... 15174661

(51) Int. Cl.
*B23B 27/10* (2006.01)
*B23B 51/06* (2006.01)
*B23C 5/28* (2006.01)

(52) U.S. Cl.
CPC .............. *B23B 27/10* (2013.01); *B23B 51/06* (2013.01); *B23C 5/28* (2013.01); *B23B 2260/072* (2013.01)

(58) Field of Classification Search
CPC ... B23B 2260/072; B23B 27/10; B23B 27/16; B23B 51/06; B23C 5/28; Y10T 409/304032; Y10T 407/2272; Y10T 407/2274; Y10T 407/2276; Y10T 407/2282; Y10T 407/2286; Y10T 407/229; Y10T 408/44; Y10T 408/45; Y10T 408/455; Y10T 408/94; Y10T 408/95; Y10T 408/957
See application file for complete search history.

(56) References Cited

U.S. PATENT DOCUMENTS 4,072,438 A * 2/1978 Powers ................. B23B 27/007
407/103
4,477,212 A * 10/1984 Kraft ................... B23B 27/1651
407/104

(Continued)

FOREIGN PATENT DOCUMENTS

DE      10260136 A1    7/2004
EP       0656239 A1    6/2006
(Continued)

*Primary Examiner* — Nicole N Ramos
(74) *Attorney, Agent, or Firm* — Corinne R. Gorski

(57) ABSTRACT

The present disclosure relates to a cutting tool for metal chip removing machining having at least one internal coolant channel for fluid having a flow direction. The at least one internal coolant channel having a length and including a plurality of grooves extending internally at least partially along the coolant channel.

17 Claims, 5 Drawing Sheets

(56) References Cited

U.S. PATENT DOCUMENTS

| | | | | |
|---|---|---|---|---|
| 4,640,652 A | * | 2/1987 | Rivera, Jr. | B23Q 1/0036 279/20 |
| 4,848,198 A | | 7/1989 | Royal et al. | |
| 5,311,654 A | * | 5/1994 | Cook | B23B 31/00 29/447 |
| 5,378,091 A | * | 1/1995 | Nakamura | B23Q 11/1023 279/20 |
| 5,718,156 A | * | 2/1998 | Lagrolet | B23B 27/10 407/11 |
| 6,059,296 A | * | 5/2000 | Baeder | B23B 31/1071 279/20 |
| 6,299,388 B1 | | 10/2001 | Slabe | |
| 6,394,466 B1 | * | 5/2002 | Matsumoto | B23B 31/008 279/103 |
| 6,652,200 B2 | * | 11/2003 | Kraemer | B23B 27/10 407/104 |
| 7,207,755 B2 | * | 4/2007 | Berglow | B23C 5/10 407/11 |
| 8,826,786 B2 | * | 9/2014 | Amstibovitsky | B23B 27/10 83/22 |
| 9,931,699 B2 | * | 4/2018 | Kitagawa | B23B 27/10 |
| 2006/0006576 A1 | | 1/2006 | Karos | |
| 2006/0140728 A1 | * | 6/2006 | Giannetti | B23B 27/10 407/11 |
| 2006/0230890 A1 | * | 10/2006 | Little | B23B 27/10 82/158 |
| 2010/0178116 A1 | * | 7/2010 | Watanabe | B23B 27/007 407/11 |
| 2011/0305531 A1 | | 12/2011 | Amstibovitsky et al. | |
| 2011/0311323 A1 | | 12/2011 | Hecht | |
| 2012/0163931 A1 | * | 6/2012 | Friedrichs | B23B 51/06 408/57 |
| 2012/0230780 A1 | * | 9/2012 | Henry | B23B 27/10 407/11 |
| 2014/0030033 A1 | * | 1/2014 | Luik | B23B 27/10 407/11 |
| 2016/0175938 A1 | * | 6/2016 | Kaufmann | B23B 27/10 407/11 |

FOREIGN PATENT DOCUMENTS

| | | | |
|---|---|---|---|
| JP | 406023648 A | | 2/1994 |
| JP | 06254705 A | * | 9/1994 |
| JP | 07227702 A | * | 8/1995 |
| JP | 10094904 A | * | 4/1998 |
| JP | 2006055917 A | * | 3/2006 |
| WO | 2004056519 A2 | | 7/2004 |
| WO | 2006077363 A1 | | 7/2006 |

* cited by examiner

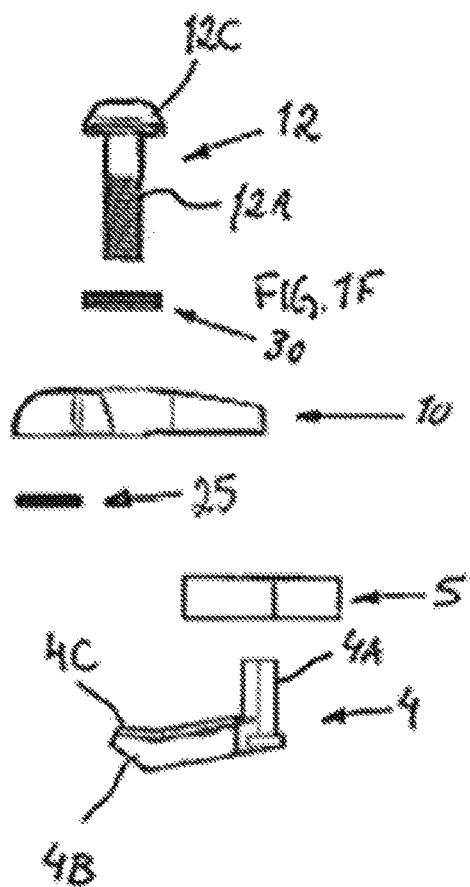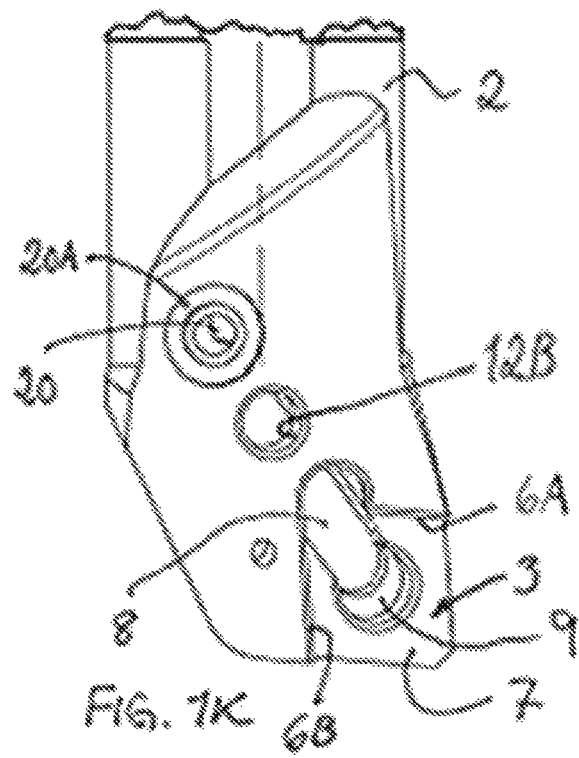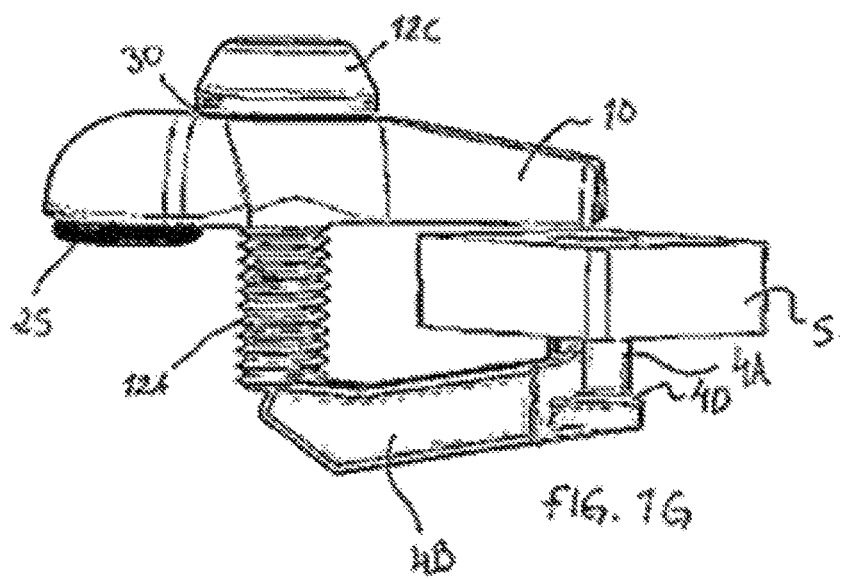

CUTTING TOOL AND A NOZZLE WITH INTERNALLY EXTENDING GROOVES

RELATED APPLICATION DATA

This application is a § 371 National Stage Application of PCT International Application No. PCT/SE2016/050523 filed Jun. 2, 2016 claiming priority to EP Application Nos. 15174654.2 and 15174661.7, each filed Jun. 30, 2015.

FIELD OF THE INVENTION

The present invention relates to a cutting tool and a nozzle arranged for metal chip removing machining and, more particularly, to such cutting tools having coolant flow channels.

BACKGROUND AND SUMMARY

It is advantageous to deliver a coolant closely to a cutting area, using a cutting tool having a coolant supply, directing a coolant to a cutting edge of the cutting insert for minimizing the heat accumulated due to the interaction of a cutting insert with a machined workpiece. Conventional techniques for providing lubrication and/or coolant to cutting edges of cutting inserts typically involve introducing the coolant via openings in a toolholder for the cutting insert, or via spray nozzles directed at the cutting edges such as U.S. Pat. No. 4,848,198. Some cutting inserts include channels formed in the cutting inserts that are in flow communication with and facilitate introduction of coolant from channels provided in the toolholder body. The provision of these coolant flow channels in the cutting inserts tends to substantially complicate manufacture of the cutting inserts, and the channels can weaken the cutting insert. It is desirable to provide a cutting tool that facilitate introduction of coolant to the cutting edges of the cutting insert that minimizes manufacturing complexity. It is also desirable to provide a cutting tool and a nozzle that facilitate introduction of coolant to the cutting edge without substantially interfering with the strength of the cutting insert.

SUMMARY OF THE INVENTION

According to an aspect of the present invention, a cutting tool having at least one internal coolant channel for fluid having a flow direction, the at least one internal coolant channel having a length, wherein the at least one coolant channel comprises grooves extending internally at least partially along the coolant channel for enhanced flow properties.

According to another aspect of the present invention, the direction of the grooves coincides with the flow direction at least along half of the length of the coolant channel to reduce obstruction of the flow of coolant.

According to another aspect of the present invention, the the grooves coincide with the flow direction along at least 80% of the length of the coolant channel to further reduce obstruction of the flow of coolant.

According to another aspect of the present invention, a size of the groove is in the range of 0.1 to 30 micrometers.

According to another aspect of the present invention, the coolant channel has a changing cross-section to divide the volumetric flow of the coolant.

According to another aspect of the present invention, the coolant channel has a diameter, in the range of 0.1 mm to 8 mm.

According to another aspect of the present invention, the size of a second opening of the coolant channel defines the smallest diameter of the coolant channel such to increase coolant speed.

According to an aspect of the present invention, a tool comprises a holder body, a cutting insert and a nozzle, said nozzle having a single through hole for a fastening member, said nozzle having a forward end, a rear end and a bottom face, said through hole extending between the bottom face and an opposite top face, at least one internal coolant channel being provided in the nozzle and extending from a first opening to a second opening, said first opening connecting to a coolant supply conduit in the holder body, said second opening serving as exit for the coolant at the forward end, wherein the at least one coolant channel and the first opening are spaced from the through hole to avoid interference therewith.

According to another aspect of the present invention, the nozzle is a removable nozzle for turning applications where coolant cools the cutting insert and the tool comprises means to coolant-tightly seal the nozzle relative to the holder body to avoid leakage of coolant.

According to another aspect of the present invention, the at least one coolant channel follows a smooth path without sudden directional changes thereby enhancing coolant flow.

According to another aspect of the present invention, there are two coolant channels extending at opposite sides of the through hole thereby facilitating increase in coolant flow while keeping the nozzle sturdy.

According to another aspect of the present invention, the first opening is situated between the through hole and the rear end to make more space for fastening means.

According to another aspect of the present invention, the bottom face of the nozzle comprises a guide device such as a projection or recess adjacent to the forward end to set the direction of the nozzle by having the guide device cooperating with a recess or projection on a cutting insert or clamping means.

According to another aspect of the present invention, the nozzle is a one-piece unit made through additive manufacturing, such that it has no plugged holes.

According to another aspect of the present invention, a single fastening member or screw secures both the cutting insert and the nozzle.

According to a further aspect of the present invention, a nozzle arranged for metal chip removing machining having at least one internal coolant channel for fluid having a flow direction, the at least one internal coolant channel having a length, wherein the at least one coolant channel comprises grooves extending internally at least partially along the coolant channel for enhanced flow properties.

BRIEF DESCRIPTION OF THE DRAWINGS

The features and advantages of the present invention are well understood by reading the following detailed description in conjunction with the drawings in which like numerals indicate similar elements and in which:

FIG. 1F is an exploded side view of components including the nozzle of FIGS. 1B-1E of the cutting tool according to an aspect of the present invention;

FIG. 1G is a side view of the components;

FIG. 1K is a top view of a holder body of the cutting tool in FIG. 1A;

Figure 1A:
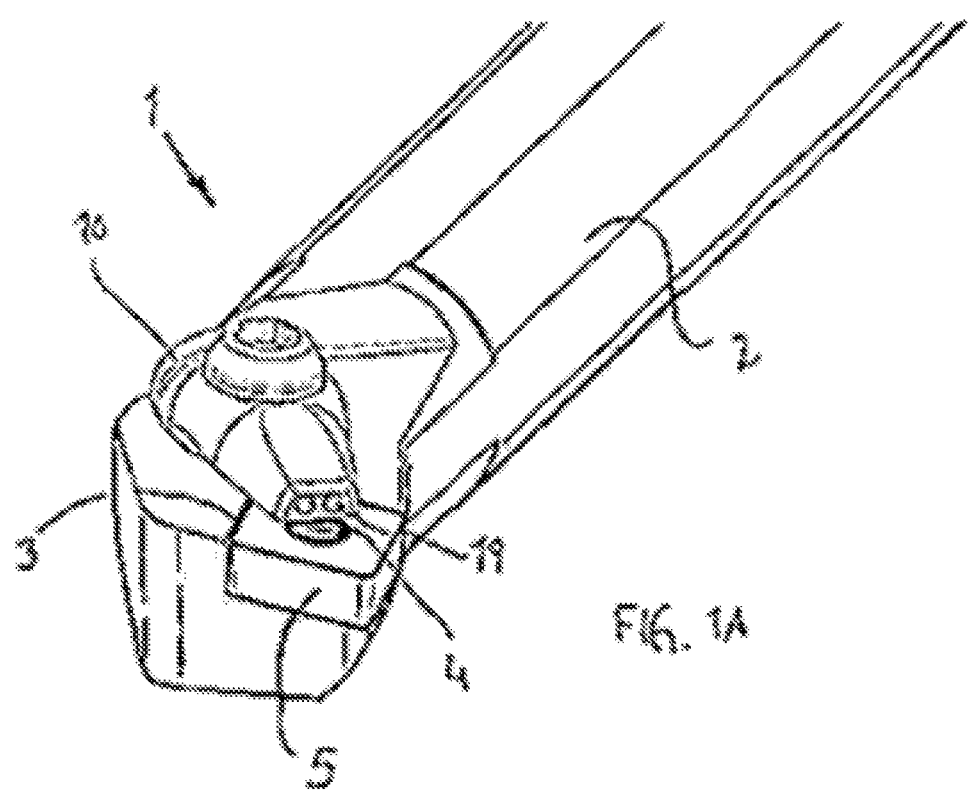
FIG. 1A is a perspective view of a cutting tool according to an aspect of the present invention.
Figure 1B:
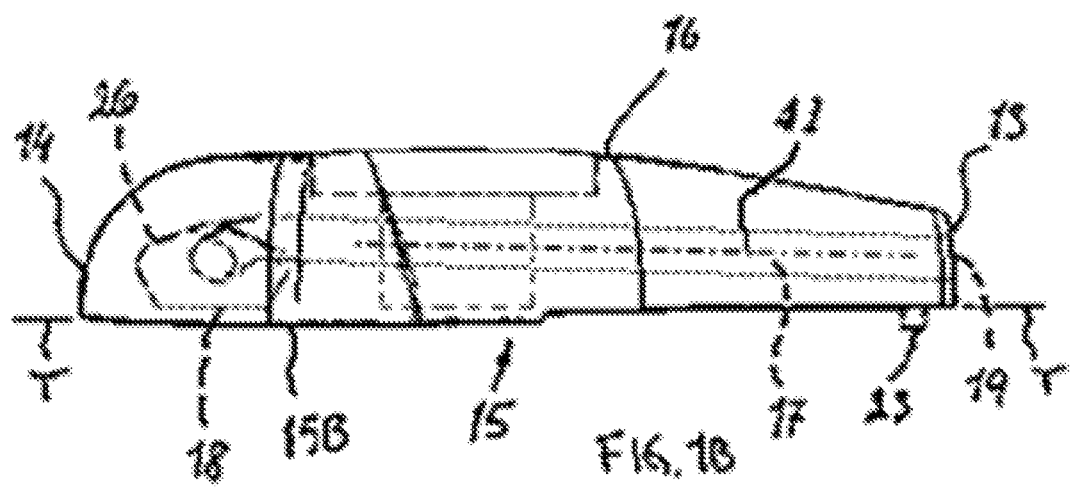
FIG. 1B is a side view of a nozzle of the cutting tool in FIG. 1A.
Figure 1C:
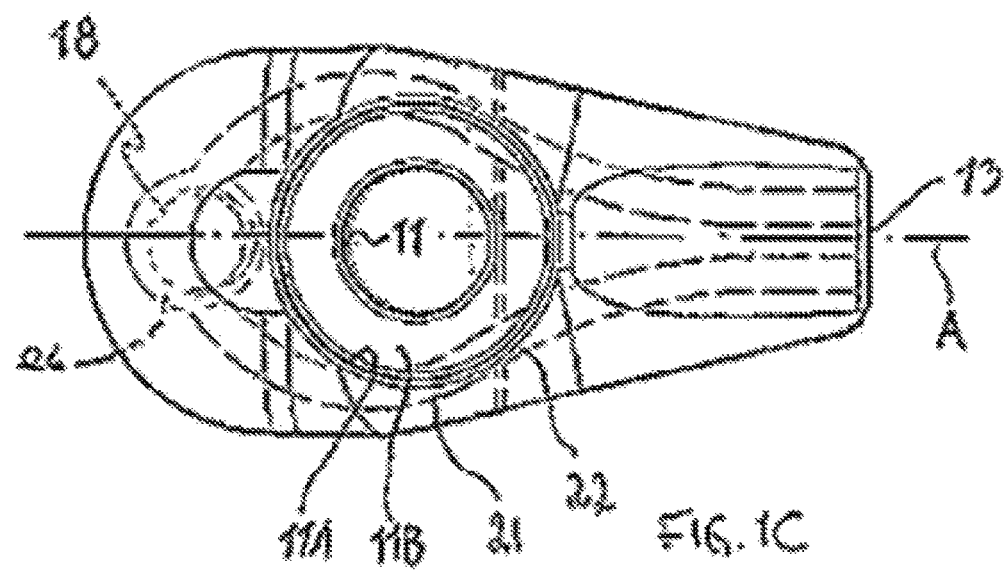
FIG. 1C is a top view of the nozzle.
Figure 1D:
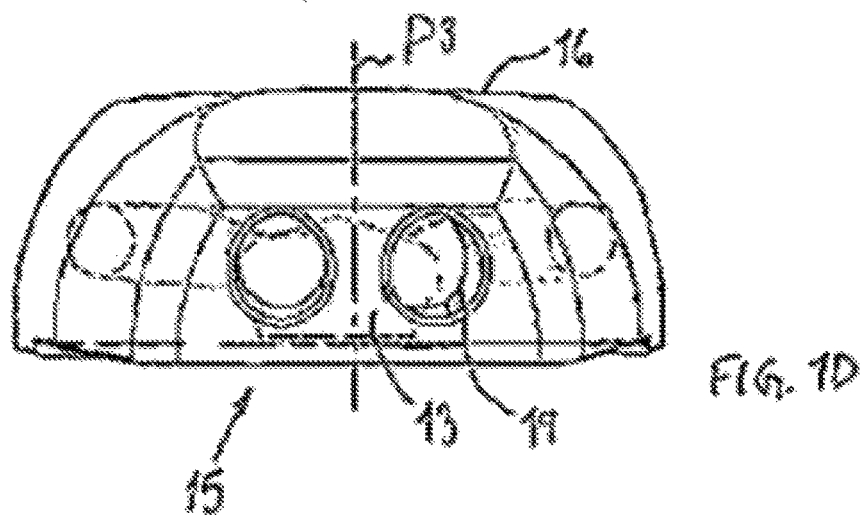
FIG. 1D is a front view of the nozzle.
Figure 1E:
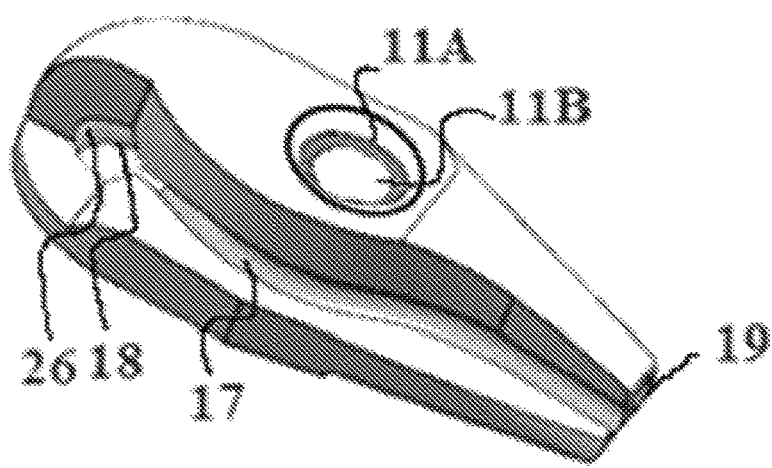
FIG. 1E is a perspective front view of the nozzle, partially in section.
Figure 1H:
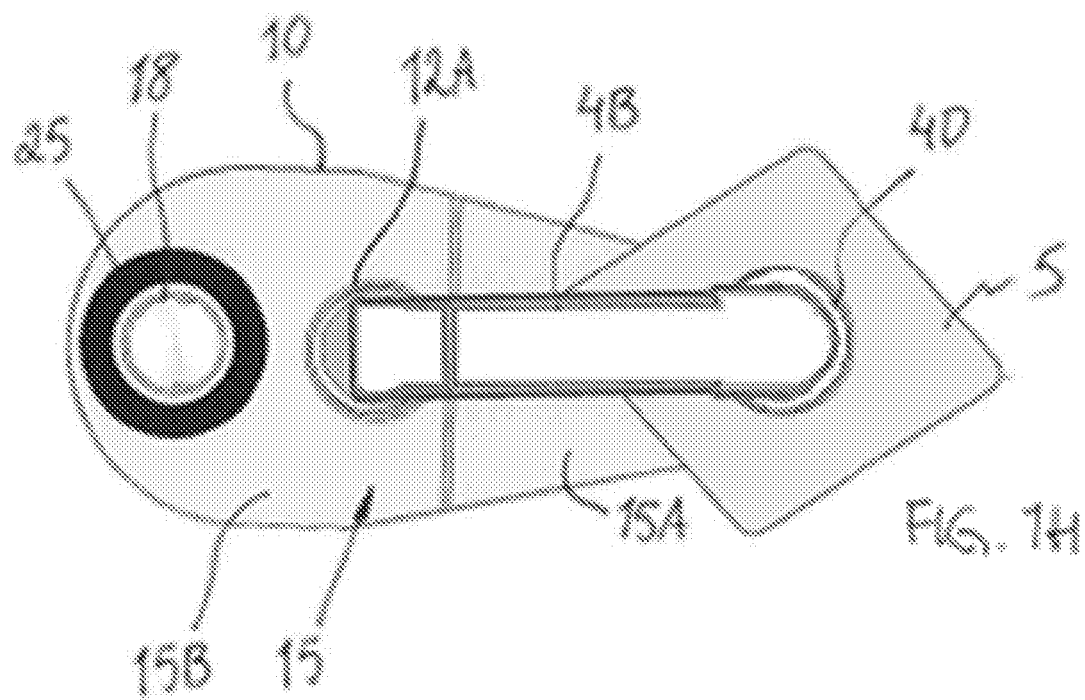
FIG. 1H is a bottom view of the components.
Figure 1I:
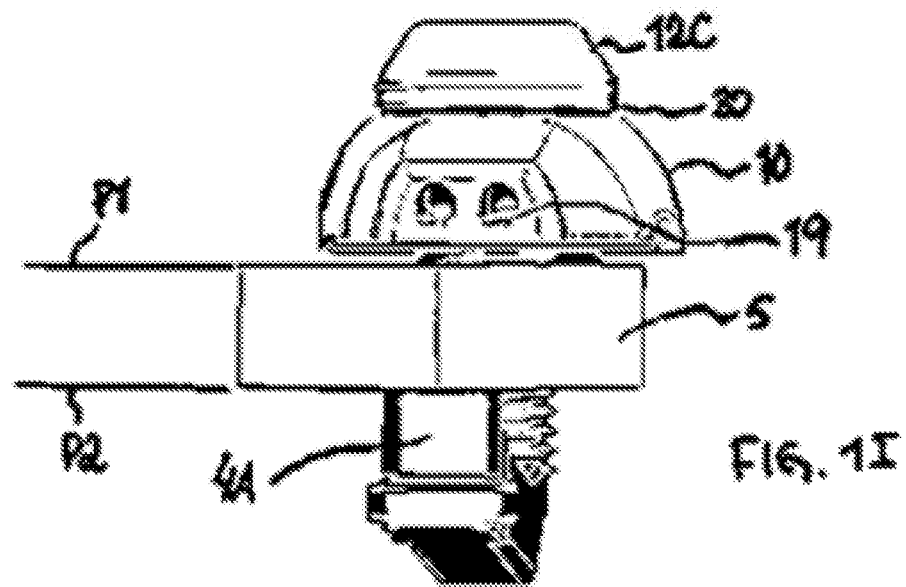
FIG. 1I is a front view of the components.

The FIGS. 1B, 1C, and 1D have been depicted by at least partly transparent illustrations for ease of understanding. It is however understood that the tools themselves are not transparent.

DETAILED DESCRIPTION

Figure 1J:
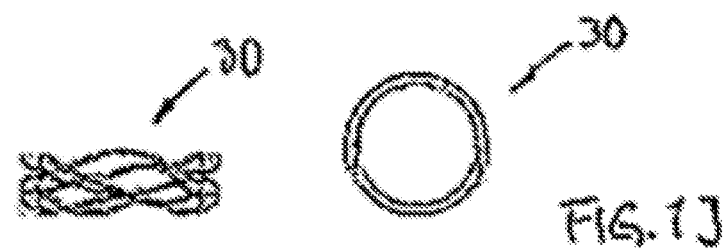
FIG. 1J is a side view and top view of a spring included in the components.
Figure 1L:
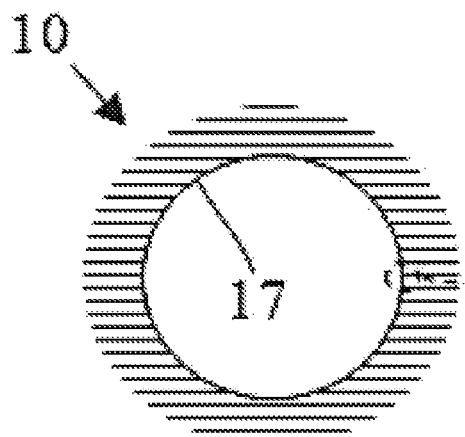
FIG. 1L is a cross-sectional view of a channel in the nozzle.
Figure 1M:
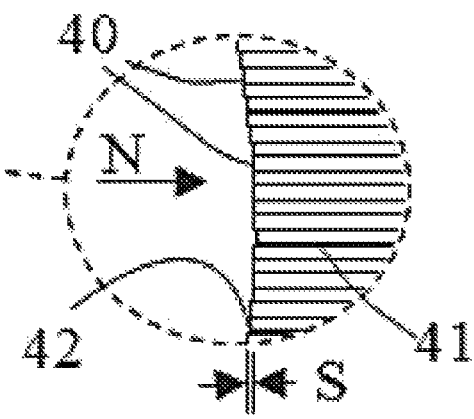
FIG. 1M is an enlarged view of the cross-section view in FIG. 1L.
Figure 1N:
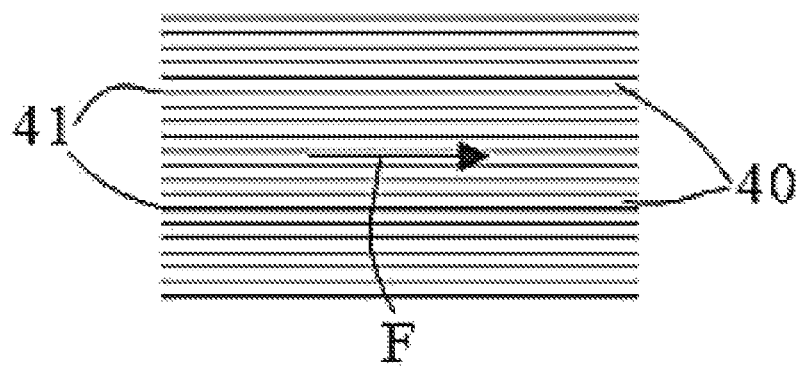
FIG. 1N is an side view according to the arrow N in FIG. 1M.

Reference is made to FIGS. 1A-1N showing a cutting tool 1 and a nozzle 10 in accordance with the present invention. The shown cutting tool 1 may be a turning tool for internal metal machining and comprises a holder body 2 having a pocket 3, a clamping means in the shape of a locking member 4 and an inducer or nozzle 10. The pocket 3 is conventional and may have a bottom surface 7 and two upstanding walls 6A and 6B. The bottom surface 7 may have a recess 8 to accommodate the locking member 4. The bottom surface may be provided with a removable shim, not shown. The recess 8 is key lock shaped in top view, e.g. a combination of a circle and a rectangle, and may have a ledge 9 below about a center of the bottom surface 7. The indexable cutting insert 5 is clamped in the pocket by means of an L-shaped locking member 4 projecting into a hole of the cutting insert. In the illustrated embodiment, the cutting insert and pocket are generally diamond in shape but may have other shapes. The L-shaped locking member urges the converging sides of the cutting insert 5 against upstanding walls 6A and 6B, which are of substantially complementary shape to the sides of the cutting insert. The locking member forms one leg 4B of an L-shape pivotally arranged in the recess 8 in the holder 2, the other leg 4A of which member extends through a hole of the cutting insert 5. The locking member may have a rim 4D which rests upon the ledge 9 in the recess 8. Actuating means or fastening means 12 is provided to move the leg 4B downwardly and by this cause a pivoting action of the locking member around an axis and about a fulcrum point of the rim 4D and the ledge 9. The said axis forms substantially a right angle with the direction in which the leg 4B extends. In the illustrated embodiment, the means 12 is in the form of a screw 12A threadably engaged in a hole 12B in the holder 2. The screw 12A may have a single threaded end portion and may have an end portion arranged to engage the free end 4C of the leg 4B of the L-shaped locking member 4, when the screw 12A is turned, to cause said pivoting action of the locking member around the fulcrum point formed in the holder 2. The leg 4A passes through the recess 8 in the holder, the opening being shaped and dimensioned so as not to impede desired pivotal movement of the legs. The locking member leg 4A extends into a central hole in the cutting insert and serves to detachably secure the cutting insert in the pocket 3. The pivotal movement of the leg 4A causes the cutting insert 5 to move towards the walls 6A and 6B and be clamped thereto.

The screw 12A may extend along a hole 12B in the holder body 2. The screw is intersected by upper (P1) and lower (P2) imaginary planes of the cutting insert. The planes P1 and P2 may be parallel and each plane may touch at least two, preferably three or four, corner portions of the upper and lower surface of the cutting insert, respectively. The nozzle 10 exhibits mirror symmetry about a first plane P3 containing a longitudinal axis A of the nozzle as can be seen, for example, in FIG. 1D. The nozzle may be a one-piece unit. The nozzle includes a forward end 13, a rear end 14 and a bottom face 15. The bottom face 15 comprises a first surface 15A and a second surface 15B, the first surface being generally recessed relative to the second surface. A single through hole 11 extends between the bottom face 15 or the second surface 15B and an opposite top face 16. The single through hole 11 may be surrounded by an enlarged cavity 11A at the top face 16. At least one internal coolant channel 17 is provided in the nozzle that extends from a first opening 18 to a second opening 19, and is preferably not having any strength reducing or plugged holes such as stop screws in holes. The at least one internal coolant channel has a length. The first opening 18 is connectable to the coolant supply conduit 20 in the holder body. The first opening 18 is located at the second surface 15B of the bottom face 15. The second surface 15B projects such that a tangent T to the first surface 15A facing the cutting insert 5, and perpendicular to a through hole axis intersects the first opening or the channel 17. The first opening 18 is positioned between the through hole 11 and the rear end 13 and may comprise a chamber 26 in flow communication with the second opening 19. The second opening 19 serves as exit for the coolant at the forward end 13. The at least one coolant channel 17 and the first opening 18 are spaced from, i.e. not in contact with the through hole 11. The at least one coolant channel 17 may follow a smooth path without sudden directional changes such that coolant flow is not obstructed. At least a first portion 21 of the coolant channel 17 transits mathematically smooth or continuous into a second portion 22 of the coolant channel. The first and second portions of the coolant channel are designed such that first derivatives thereof are continuous if their lower peripheries are seen as mathematical curves for example as in the top view of FIG. 1C. Thereby, there will be reduced risk for oil traps when using oil mist as coolant.

The nozzle 10 can be held to the holder body by the fastening member 12, preferably by the screw 12A. The single through hole 11 receives the fastening member 12 carrying a spring 30 and that is threadedly secured to a hole 12B in the holder body. The cavity 11A bottom 11B is intended to serve as a seat for the spring 30, such as a multiwave compression spring of for example stainless steel. Multiwave compression springs may be used in applications where space problems in length preclude the option of using a normal compression spring. The spring 30 is more closely shown in FIG. 1J. Other spring means can be used such as rubber washers. The nozzle does not have a front projection to engage a wall of the through hole of the cutting insert. The coolant is led through conduits passing through the holder body and requires connecting passageways and a deformable seal to lead the coolant to a discharge exit 19.

The fastening member 12 may have a head 12C which has an underside that can act on the spring 30 and urge the nozzle towards the holder. A seal element 25, such as an O-ring may be secured to or be loosely held by the nozzle or be secured to or be loosely held by a concave cavity 20A surrounding the conduit 20 opening in the holder body 2. The seal element 25 may be compressed between the nozzle and the holder body during the tightening of the fastening member to coolant-tightly seal the conduit 20 opening.

At mounting of the cutting insert 5 to the holder body 2 the locking member 4 sits in the recess 8 by interaction of the rim 4D and the ledge 9 in a conventional manner. The screw 12A is passed through the spring means 30 and the nozzle hole 11 and threaded through the hole 12B in the holder body 2. Suitably, the nozzle is rotated about the screw 12 to a position where it does not interfere with the space needed to mount the cutting insert. The end of the screw 12A will abut against the leg 4B and thereby cause pivotal movement of the leg 4A. If a cutting insert 5 is mounted in the pocket 3 the leg 4A will urge the cutting insert in direction towards the upstanding walls 6A and 6B. The nozzle is rotated about the screw into desired position when the cutting insert has been mounted. The screw head 12C will act on the spring means 30 and force the nozzle in direction towards the holder body. By choosing the correct elasticity property for the spring means 30 and the correct direction of the nozzle, the nozzle will become clamped against the holder body via the interaction of the seal 25 and the concave cavity 20A. The nozzle first surface 15A is spaced from, i.e. not in contact with the cutting insert 5 in assembled state. The holder body and/or the nozzle may be provided with means to guide the nozzle to a desired direction, such as protrusions acting peripherally on the nozzle or at least one protrusion acting in the forward end of the nozzle acting centrally on the cutting insert. The nozzle in this embodiment is not meant to clamp on the cutting insert but can do so if for example a thicker O-ring is used instead of the O-ring 25 shown. In the latter case the nozzle will tilt about an axis perpendicular to the length axis A and the forward end thereof will contact the cutting insert.

The bottom face 15 of the nozzle may comprise a guide device 23, such as a projection or recess, close to or at the forward end 13 to direct the nozzle and thereby direct a coolant jet by having the guide device releasably cooperating with a recess or projection on a cutting insert or at a clamping means such as the locking member 4. The projection 23 may be part of the forward end 13 or spaced from it by a distance that is less than a half length of the nozzle. Preferably the projection is formed close to the forward end like in for example FIG. 1B for best guidance of the coolant.

The nozzle 10 can be produced by a process from the group of the rapid prototyping processes. The nozzle may be made through additive manufacturing such as metal 3D printing processes which use binders, or fully dense metal processes like selective laser sintering (SLS) or direct metal laser sintering (DMLS). The latter technology uses a high power laser to fuse small particles of metal powders into a nozzle that has the described three dimensional shape. A laser beam "draws" directly on the powder so that only selected portions of the powder are solidified. The powder is said to be "scanned" by the laser. The use of a laser in this manner allows layers of different shape to be easily and rapidly fused, enabling complex objects with intricate internal structures to be produced. The laser selectively fuses the powdered metal by scanning the cross-sections (or layers) generated by a three dimensional modeling program on the surface of a powder bed. After each cross-section is scanned, the powder bed is lowered by one layer thickness. Then a new layer of material is applied on top and the process is repeated until the nozzle is completed. The rapid prototyping process makes it possible to produce complex nozzles which may or may not require subsequent machining. FIGS. 1L, 1M and 1N schematically show the channel 17 made by a rapid prototyping process, wherein layers 40 have been stacked upon each other to produce the internal channel by fusing material around non-fused powder. The non-fused powder is removed when the nozzle is completed. The joint 41 between two adjacent layers produces a visible step or groove 42. The grooves extend internally at least partially along the coolant channel. The axial extensions of the grooves 42 are chosen to coincide with the flow direction F of the coolant or central axis of the channel 17 to a largest possible degree, i.e. a direction of the joints 41 or grooves 42 coincides along least at half of the length of the channel to reduce flow obstruction. The joints 41 coincide with the flow direction along at least 80% of the length of the channel, see exemplary line 41 in FIG. 1B. The size S of the groove 42 may vary in the range of 0.1 to 30 micrometers or be constant in the range of 0.1 to 30 micrometers. The size may depend on the resolution of the manufacturing equipment being used. By having grooves or steps aligned with the flow direction the flow of coolant will be unobstructed. The terms "coincide" or "aligned" here include that small deviations from the ideal path, such as about ±5 degrees, are acceptable.

In use the shown tool will be turning metal workpieces while coolant may flow in order through the holder body 2, the coolant supply conduit 20, the seal 30, the fluid channel 17 and from the exit 19 to at least one active cutting edge.

Stated another way, a single fastening member 12 or screw 12A secures both the cutting insert 5 and the nozzle 10.

Tool life generally increases with increase in coolant supply pressure. This can be attributed to the ability of the high-pressure coolant to lift the chip and gain access closer to the cutting interface. This action leads to a reduction of the seizure region, thus lowering the friction coefficient, which in turn results in reduction in cutting temperature and cutting forces. Preferably the pressure used in the discussed embodiments is above 30 bar, often above 100 bar coolant pressure.

The coolant channel 17 may have a diameter, for example in the range of 0.1 mm to 8 mm.

Thus the present invention provides a cutting tool and a nozzle which can be produced flexibly and with relatively complex structures in a simple and cost-effective process. The coolant channel may have a changing cross-section. With a changing cross-section, it is possible to divide the volumetric flow of the coolant in a desired manner between several different coolant channels in the nozzle. It is possible to reduce the size of the outlet opening 19 of the coolant channel 17 such to increase coolant speed. Thus, the size of the second opening 19 of the coolant channel 17 may define the smallest diameter of the coolant channel.

In some cases it can be beneficial to use this solution regarding the grooved coolant channel in milling cutters and drilling tools too.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person. The term "nozzle" may alternatively be replaced by terms such as "clamp" and "inducer". The term "step" or "groove" may alternatively be replaced by terms such as corrugation, flute, rifle, notch and score.

While this invention has been illustrated and described in accordance with a preferred embodiment, it is recognized that variations and changes may be made therein without departing from the invention as set forth in the claims.

The disclosures in EP Patent Application Nos. 15174654.2 and 15174661.7, from which this application claims priority, are incorporated herein by reference.

The invention claimed is:

1. A cutting tool for metal chip removing machining comprising:
   a holder body;
   a cutting insert; and
   a nozzle, the nozzle having a single through hole for a fastening member and having at least one internal coolant channel for fluid having a flow direction, the at least one internal coolant channel having a length, wherein the at least one coolant channel includes a plurality of grooves extending internally at least partially along the at least one internal coolant channel, the nozzle having a forward end, a rear end and a bottom face, wherein the through hole extends between the bottom face and an opposite top face being provided in the nozzle and extending from a first opening to a second opening, the first opening connecting to a coolant supply conduit in the holder body, the second opening serving as an exit for the coolant at the forward end, wherein the at least one internal coolant channel and the first opening are spaced from the through hole.

2. The tool according to claim 1, wherein a direction of the plurality of grooves coincides with the flow direction at least along half of the length of the at least one internal coolant channel.

3. The tool according to claim 1, wherein the plurality of grooves coincide with the flow direction along at least 80% of the length of the at least one internal coolant channel.

4. The tool according to claim 1, wherein a size of the groove is in the range of 0.1 to 30 micrometers.

5. The tool according to claim 1, wherein the at least one internal coolant channel has a changing cross-section.

6. The tool according to claim 1, wherein the at least one internal coolant channel has a diameter in the range of 0.1 mm to 8 mm.

7. The tool according to claim 1, wherein the at least one internal coolant channel has a first and a second opening, a diameter of the second opening of the at least one internal coolant channel defining a smallest diameter of the at least one internal coolant channel.

8. The tool according to claim 1, wherein the nozzle is a removable nozzle for turning applications and wherein the tool includes a seal element arranged to coolant-tightly seal the nozzle relative to the holder body.

9. The tool according to claim 1, wherein the at least one internal coolant channel follows a smooth path without sudden directional changes.

10. The tool according to claim 1, wherein there are two internal coolant channels extending at opposite sides of the through hole.

11. The tool according to claim 1, wherein the first opening is situated between the through hole and the rear end.

12. The tool according to claim 1, wherein the bottom face of the nozzle includes a guide device such as a projection or recess adjacent to the forward end arranged to set the direction of the nozzle by having the guide device cooperating with a recess or projection on the cutting insert or a clamping means.

13. The tool according to claim 1, wherein the nozzle is a one- piece unit made through additive manufacturing.

14. The tool according to claim 1, wherein a single fastening member or screw secures both the cutting insert and the nozzle.

15. A nozzle arranged for metal chip removing machining having comprising:
   a forward end, a rear end, a bottom face and a top face opposed to the bottom face;
   at least one internal coolant channel for fluid having a flow direction, the at least one internal coolant channel having a length, wherein the at least one internal coolant channel includes a plurality of grooves extending internally at least partially along the at least one internal coolant channel; and
   a single through hole arranged for a fastening member and having the at least one internal coolant channel, the through hole extending between the bottom face and the top face and extending from a first opening to a second opening, the first opening being connected to a coolant supply conduit in a holder body and the second opening serving as an exit for the coolant at the forward end, wherein the at least one internal coolant channel and the first opening are spaced from the through hole.

16. The tool according to claim 1, wherein at least one cooling channel of the at least one internal coolant channel is curved along its length.

17. The tool according to claim 1, wherein each of the plurality of grooves defines a recess in a surface of the at least one internal coolant channel.

* * * * *